United States Patent [19]

Nakayama

[11] Patent Number: 4,929,827

[45] Date of Patent: May 29, 1990

[54] INTELLIGENT PALLET

[75] Inventor: Takahide Nakayama, Kumamoto, Japan

[73] Assignee: Hirata Industrial Machineries Co., Ltd., Tokyo, Japan

[21] Appl. No.: 283,801

[22] Filed: Dec. 13, 1988

[30] Foreign Application Priority Data

Dec. 14, 1987 [JP] Japan .................. 62-189797[U]

[51] Int. Cl.⁵ .............................................. G01N 9/04
[52] U.S. Cl. .................................. 250/223 R; 250/212
[58] Field of Search .................. 250/223 R, 566, 212, 250/551; 414/270, 273, 274

[56] References Cited

U.S. PATENT DOCUMENTS 4,761,562 8/1988 Christensen et al. ........... 250/223 R

Primary Examiner—David C. Nelms
Attorney, Agent, or Firm—Buchnam and Archer

[57] ABSTRACT

An intelligent pallet is disclosed for use in assembly lines or conveyance lines of products. The pallet is essentially comprised of a memory unit including a cell and a photoelectric voltage converter, and a light emitter disposed remote from the memory unit. The converter allows a light energy charged from the emitter to change into an electric energy thereby effecting data processing. The cell is used solely for data storage, ensuring prolonged service life with least cell replacement.

3 Claims, 2 Drawing Sheets

INTELLIGENT PALLET

BACKGROUND OF THE INVENTION

1. Field of the Invention

This invention relates to intelligent pallets suitable for use with assembling lines on production equipment and also with conveying lines on distribution equipment.

2. Description of the Prior Art

In general, pallet devices of the character mentioned have a memory unit equipped as the power source with cells usually of high performance. This memory unit takes advantage of the electric energy generated from the cells so as to effect data processing from receiving and transmitting, writing in and reading out to storing.

These prior pallets of a cell-powered type, however, have a drawback in that they depend in service life upon the capacity of cells used, involving repeated replacement of cells and hence shortened storage of data. Another problem is that the life of cells is critically reduced in the case where the pallet is constructed with a sound unit and a display unit.

SUMMARY OF THE INVENTION

With the foregoing difficulties of the prior art in view, the present invention seeks to provide an improved intelligent pallet which enables the use of cell energy solely for storage of information memorized, thus contributing to prolonged service with utmost operative reliability and with least cell replacement.

It has now been found that an intelligent pallet, which comprises a photoelectric voltage converter, will convert a light energy charged from a light source into an electric counterpart and thus ensure information processing operations including receiving and transmitting as well as writing in and reading out without resorting to an electric energy of built-in cells. In this construction, sufficient amounts of electric energy can be obtained which are utilized to visually represent data and to acoustically provide information on particular data and operative conditions. Cell energy is used exclusively for information storage.

As will be better understood from the following description taken in connection with the accompanying drawings, the invention is directed to the provision of an intelligent pallet comprising a memory unit including a cell and a photoelectric voltage converter, and a light emitter disposed for remote, cooperative relation with said memory unit, said converter being capable of changing a light energy supplied from said emitter into an electric energy to thereby effect data processing, and said cell being used for data storage.

DETAILED DESCRIPTION OF THE INVENTION

Figure 1:
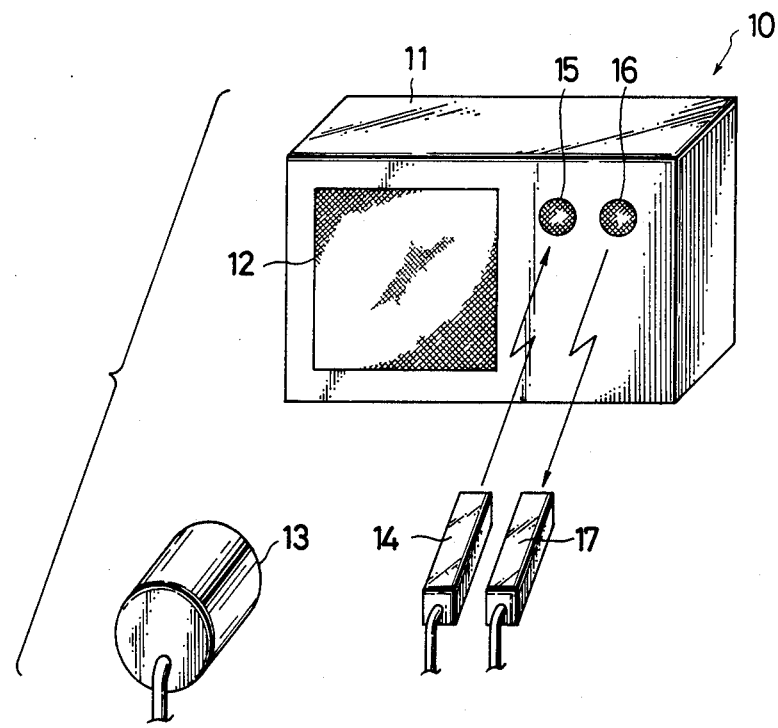
FIG. 1 is a perspective view of a memory unit and its associated devices constituting the intelligent pallet of the present invention.

With reference to the drawings and to FIG. 1 in particular, there is shown an intelligent pallet designated at 10 and embodying the principles of the present invention. The pallet 10 is essentially comprised of a memory unit 11 including a photoelectric voltage converter 12, a receiver element 15, a transmitter element 16 and a built-in cell commonly known in the art but not shown, a light emitter 13, a transmitter 14 and a receiver 17. The emitter 13 is located remote from the memory unit 11 and cooperative with the converter 12. The transmitter 14, disposed near to the emitter 13, inputs data into the receiver element 15. The receiver 17 is spaced from the transmitter 14 and arranged to receive data output out of the transmitter element 16. The converter 12 acts to change a light energy coming from the emitter 13 into an electric energy.

Importantly, the input and output operations should be accomplished using the electric energy converted above, i.e. independently of an electric energy resulting from the cell. Thus the cell energy can be used entirely for data storage so that the pallet is provided with prolonged service life without the need for periodic replacement of cells.

Figure 2:
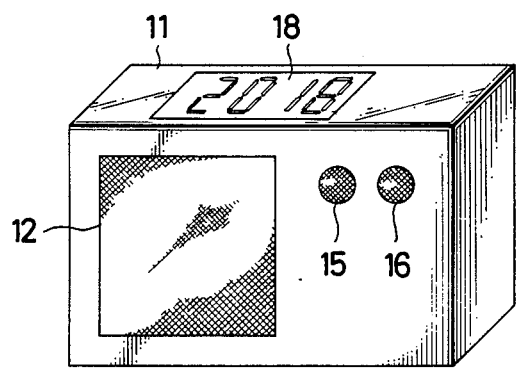
FIG. 2 is a view similar to FIG. 1, but showing another embodiment of the invention in which a display unit is disposed on top of the memory unit.

FIG. 2 is taken to illustrate the arrangement of a display unit 18 mounted for example on the top portion of the memory unit 11. Information on memorized data and operating conditions may be readily represented in a visual fashion. The display unit is operated with the use of the light-originated, converted electric energy.

Figure 3:
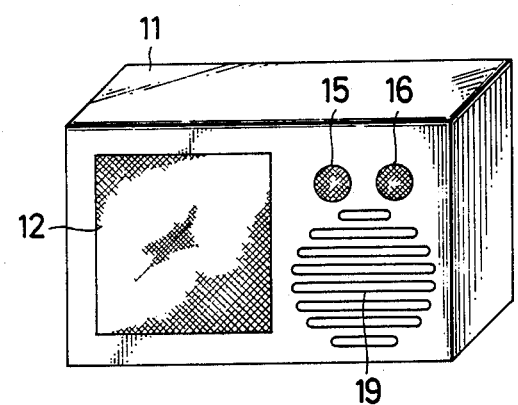
FIG. 3 is a view similar to FIG. 1, but showing a further embodiment of the invention in which a sound unit is installed on the front surface of the memory unit.

A sound unit 19 may preferably be disposed, as seen from FIG. 3, for instance on the front surface of the memory unit 11. The sound unit 19 may be a buzzer, a speaker or like means giving a specific sound upon recognition of any particular data or operative failures. To operate the sound unit, the converted electric energy is also used.

Figure 4:
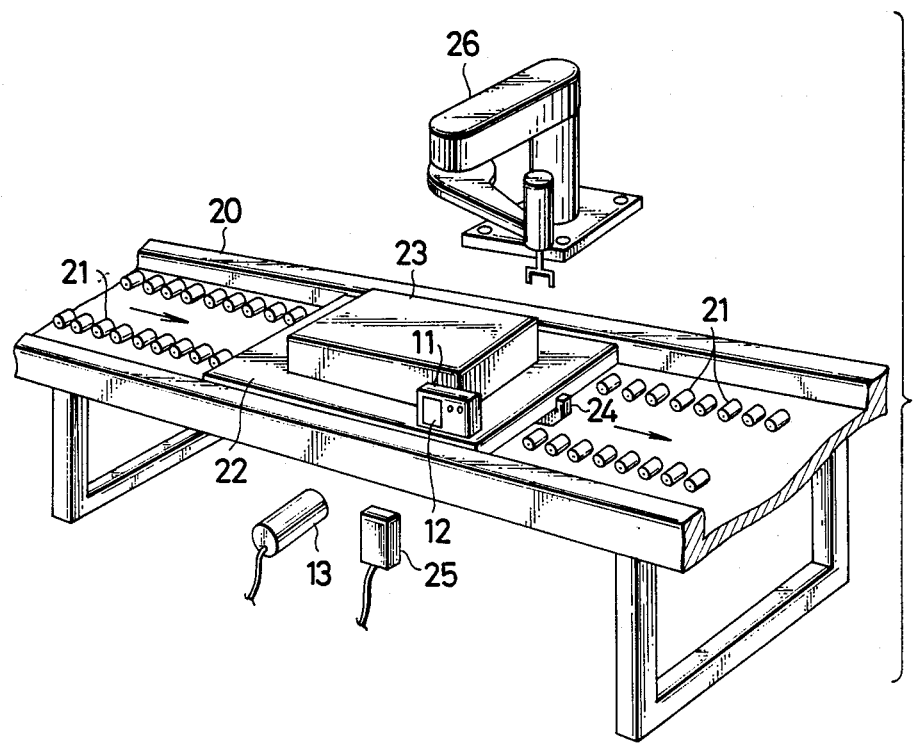
FIG. 4 is a perspective view showing the manner in which the pallet is applied on an assembly line.

FIG. 4 illustrates the manner in which the intelligent pallet 10 according to the invention is applied to an assembly line. For instance, the assembly line is made up of a conveyor 20, a multiplicity of rolls 21 and a pallet device 22 movable on the rolls 21 in a direction indicated by the arrow. The device 22 has a work 23 mounted thereon and also the memory unit 11 of the invention located in place. A stop means 24 is arranged to bring the device 22 to an inoperative position. Disposed adjacent to the stop means 24 are the light emitter 13 and a reader-writer 25 on one side and a completely self-controlled device such as for example a robot 26 on the other side.

In operation, the device 22 having carried thereon the work 23 and the memory unit 11 is advanced and terminated at a position in front of the robot 26 by the action of the stop means 24. The converter 12, generally called a solar cell, initiates to operate upon exposure to a light energy supplied from the emitter 13, leading to transmission of the reader-writer 25. This in turn renders the robot 26 workable in compliance with given information as to the work 23. Any error or failure resulting from the work 23 is written in and stored in the memory unit 11. The stop means 24 on completion of the working is released to advance the device 22 with the worked product and the memory unit carried thereon. At this stage the converter 12 is brought to an end as it is placed out of path of the light source. The data input in the memory unit is suitably retained and stored with the use of an electric energy of the built-in cell.

With such arrangement, cell energy is applicable solely to retaining the data and hence long in life; that is, prolonged data storage is possible. Another advantage is that as it is in operative state only when necessary, the converter is rather free of misoperation arising out of external interference and highly satisfactory in respect of safety and reliability. Excess electric energy is useful in operating a display unit and a sound unit when installed.

Although the invention has been shown and described, it will be apparent to those skilled in the art that many changes and modifications may be made without departing from the scope of the appended claims.

What is claimed is:

1. An intelligent pallet comprising a memory unit, a light emitter means and a data processing unit disposed in remote, cooperative relation with said light emitter means, said memory unit comprising a photoelectric voltage converter and an electric cell, said voltage converter powering only data for processing, said voltage converter being activatable to receive and convert a light energy emitted from said emitter means into an electric energy and to send said electric energy to said processing unit thereby effecting a series of operation including receiving, transmitting, recording, reading out a stream of data, external to said memory unit, said cell being operable to generate an electric energy solely for storage of the data.

2. The pallet according to claim 1 further including a display unit mounted on said memory unit whereby the data while in processing or already stored are visually represented, said unit being activated by the electric energy induced from said voltage converter.

3. The pallet according to claim 1 further including a sound unit mounted on said memory unit whereby the data while in processing or already stored are acoustically transmitted, said sound unit being activated by the electric energy induced from said voltage converter.

* * * * *